(12) United States Patent
Jeffryes

(10) Patent No.: US 6,766,256 B2
(45) Date of Patent: Jul. 20, 2004

(54) PROCESSING SIMULTANEOUS VIBRATORY SEISMIC DATA

(75) Inventor: Benjamin Peter Jeffryes, Histon (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 10/203,435

(22) PCT Filed: Feb. 13, 2001

(86) PCT No.: PCT/GB01/00588

§ 371 (c)(1), (2), (4) Date: Oct. 23, 2002

(87) PCT Pub. No.: WO01/61379

PCT Pub. Date: Aug. 23, 2001

(65) Prior Publication Data

US 2003/0093224 A1 May 15, 2003

(30) Foreign Application Priority Data

Feb. 15, 2002 (GB) .............................. 0003400

(51) Int. Cl.⁷ .............................................. G06F 1/28
(52) U.S. Cl. ..................................................... 702/17
(58) Field of Search .................... 702/14, 17; 367/43, 367/45, 46

(56) References Cited

U.S. PATENT DOCUMENTS

| | | |
|---|---|---|
| 3,398,396 A | 8/1968 | Embree |
| 3,984,805 A | 10/1976 | Silverman |
| 4,042,910 A | 8/1977 | Rietsch |
| 4,159,463 A | 6/1979 | Silverman |
| 4,616,352 A | 10/1986 | Sallas et al. |
| 4,646,274 A | 2/1987 | Martinez |
| 4,715,020 A | 12/1987 | Landrum, Jr. |
| 4,799,201 A | 1/1989 | Nelson |
| 4,823,326 A | 4/1989 | Ward |
| 4,864,546 A | 9/1989 | Russell et al. |

(List continued on next page.)

FOREIGN PATENT DOCUMENTS

| | | |
|---|---|---|
| EP | 0 147 166 | 7/1985 |
| GB | 2 289 366 A | 11/1995 |
| WO | 96/31788 A1 | 10/1996 |
| WO | 98/12578 A1 | 3/1998 |

OTHER PUBLICATIONS

Baeten et al Proposed processing sequence The Vibroseis Source, Advances in Exploration Geophysics 3, Elsevier 1990, pp. 216–225.

(List continued on next page.)

Primary Examiner—Donald McElheny, Jr.
(74) Attorney, Agent, or Firm—William L. Wang; William B. Batzer; John J. Ryberg

(57) ABSTRACT

A method of processing seismic data, said seismic data having been obtained by: performing a plurality of sweeps, wherein each sweep comprises generating seismic signals in the earth using a plurality of vibrators by applying a pilot sweep wave-form to each vibrator, each pilot sweep being a waveform of changing frequency; measuring the force applied to the earth by each vibrator to determine a measured force waveform; and measuring the seismic signals at one or more locations remote from the vibrators; said method comprising: filtering the measured force waveform to remove harmonics of the pilot sweep and thus determining a filtered force waveform; generating an inversion operator from the filtered force waveform for each vibrator; and applying said inversion operator to the measured seismic signals to determine the contribution of each vibrator to the seismic signals.

11 Claims, 11 Drawing Sheets

U.S. PATENT DOCUMENTS

| | | | |
|---|---|---|---|
| 4,882,713 A | | 11/1989 | Hughes |
| 4,899,321 A | | 2/1990 | Solanki |
| 4,982,374 A | | 1/1991 | Edington et al. |
| 5,134,590 A | | 7/1992 | Garotta |
| 5,410,517 A | | 4/1995 | Andersen |
| 5,703,833 A | | 12/1997 | Allen |
| 5,719,821 A | | 2/1998 | Sallas et al. |
| 5,850,622 A | | 12/1998 | Vassiliou |
| 5,901,112 A | | 5/1999 | Walker |
| 6,161,076 A | * | 12/2000 | Barr et al. .................... 702/17 |

OTHER PUBLICATIONS

Hofstetter et al A new technique for the design of non–recursive digital filters Proceedings of the 5$^{th}$ annual Princeton Conf. Inform. Sci. Syst., 1971, pp. 64–72.

Jeffryes Far–field harmonic measurement for seismic vibrators Technical Abstracts of the 66$^{th}$ annual meeting of the SEG, Nov. 10–16, 1996, ACQ 3.1, pp. 60–63.

Klemperer Seismic noise–reduction techniques for use with vertical stacking: An empirical comparison Geophysics, vol 52, No 3, 1987, pp. 322–334.

Li et al Elimination of harmonic distortion in Vibroseis data Geophysics, vol 60 No 2, 1995, XP–002167804, pp. 503–516.

Martin Simultaneous vibroseis recording Geophysical Prospecting, vol 41, 1993, pp. 943–967.

Martin et al Two methods for continuous monitoring of harmonic distortion in Vibroseis signals Geophysical Prospecting, vol 37, 1989, pp. 851–872.

Martin et al The behaviour of a seismic vibrator using different phase control methods and drive levels First Break, vol 8, No 11, 1990, pp. 404–414.

Oppenheim et al Digital Signal Processing Prentice–Hall, 1975, pp. 255–269.

Rietsch Reduction of harmonic distortion in vibratory source records Geophysical Prospecting, vol 29, 1981, pp. 178–188.

Rozemond Slip–sweep acquisition Technical abstracts of the 66$^{th}$ annual meeting of the SEG, Nov. 10–16, 1996, ACQ3.2, pp. 64–67.

Sallas Seismic vibrator control and the downgoing P–wave Geophysics vol 49, No 6, 1984, pp. 732–740.

Sallas et al Comments on "the amplitude and phase response of a seismic vibrator" by W.E. Lerwill Geophysical Prospecting, vol 30, 1982, pp. 935–938.

Schrodt Techniques for improving Vibroseis data Geophysics, vol 52, 1987, pp. 469–482.

Smith et al Exact reconstruction techniques for tree–structured subband coders IEEE Transactions on Acoustics, Speech and Signal Processing, vol ASSP–34, No 3, Jun. 1986, pp. 434–441.

Wams et al Recent developments in 3–D acquisition techniques using vibroseis in Oman Leading Edge, vol 17, No 8, Aug. 1998, pp. 1053–1063.

Werner Application of Vibroseis simultaneous multiple source recording Proceedings of the 63$^{rd}$ annual meeting of the SEG, SA2.5, pp. 569–571.

* cited by examiner

PROCESSING SIMULTANEOUS VIBRATORY SEISMIC DATA

FIELD OF THE INVENTION

This invention relates to methods for generating and processing simultaneous vibratory seismic data.

BACKGROUND OF THE INVENTION

In seismic prospecting using simultaneous vibratory techniques, a series of seismic energy sources or vibrators are employed to transmit seismic signals into the earth. Part of these signals are reflected from interfaces between subterranean strata, and/or refracted within strata, back to the surface of the earth, where they are detected by one or more receivers. The time taken for a signal to pass from a particular vibrator to a particular receiver gives an indication of the length of travel of the signal between that vibrator and that receiver, from which the structure of geological formations may be deduced.

Vibrators generally consist of a base plate in contact with the ground, with a large weight applied to this plate. The seismic energy is transmitted to the ground by applying a vibratory force to the plate. Thus if a constant weight of 30 tonnes is applied to the metal plate, a vibration with amplitude 20 tonnes can be applied to the vibrator, ensuring that there is always a positive force against the ground.

Many modern vibratory seismic surveys are performed by simultaneously imparting energy into the earth from multiple source locations, so that each receiver will detect refracted and reflected energy which has been emitted by the whole series of vibrators. The data recorded at each receiver must then be processed so that the signal due to each individual vibrator can be separated out.

This is generally achieved by each vibrator performing multiple "sweeps" or "shots", where the phase of the signals emitted by the vibrators are varied between vibrators and between shots. In its simplest form, this can be illustrated by the case of two vibrators, twice operated simultaneously. If they are operated in phase with each other for the first sweep, but 180° out of phase for the second sweep, the receiver will record two signals. These signals may be added together to determine the signal arriving from the first vibrator, or subtracted to determine the signal arriving from the second vibrator.

In general, in order for the data arriving at each receiver to be decoded so that the contribution of each vibrator can be determined, there must be at least as many shots as there are vibrators. For each shot by each vibrator, a waveform is applied to that vibrator by the control mechanism. This waveform is normally a constant amplitude swept-frequency "chirp", with tapered ends due to the fact that the amplitude has to be ramped up at the start and ramped down at the end, and is known as the "pilot sweep". In modern seismic operations, the pilot sweep almost always begins at low frequency and finishes at high frequency, and the frequency normally increases linearly with respect to time.

In practice, the waveform actually applied to the ground by the vibrator is not quite the same as the waveform applied to the vibrator. Deviations from the pilot sweep are inevitable. These deviations have two characteristic forms:

1. As well as applying a force at the desired frequency (known as the fundamental), the vibrator also applies a force at integer multiples of that frequency (known as harmonics).

2. The force applied at the fundamental frequency deviates in amplitude and/or phase from the pilot sweep.

At each receiver, in order to separate out the signal from each vibrator, it is necessary to use some approximation of the signal provided by each vibrator. In the past, two methods have chiefly been used.

The first assumes that the vibrator force follows the pilot sweep exactly, and separates out the earth response due to the vibrator at each vibrator location accordingly. If such a method is used, the data at each receiver, or geophone, can be correlated with a single representative pilot sweep before separation. No measurements need to be made on the vibrator, and the procedure is robust. Non-linear effects such as a non-linear earth response or data clipping during acquisition will not leave significant artifacts.

The main disadvantage with this method is that deviations of the force applied at the fundamental from the pilot sweep can lead to significant cross-coupling of the vibrators, i.e. the signal from one vibrator being ascribed to another. This occurs if each vibrator has a different deviation from the pilot sweep. This method can also lead to timing errors for the individual vibrators.

The second known method uses a measurement of the force applied to the earth by the vibrator. Thus, instead of using the pilot sweep, the real force applied by the vibrator is used to derive an inversion operator. This removes the main disadvantage of using the pilot sweep, but itself has other disadvantages. The whole inversion procedure must be performed on uncorrelated data, the entire waveform of each shot must be acquired for each vibrator and each shot, and the method is sensitive to the non-linear effects described above.

In general, the data acquisition and much of the processing are performed separately. The data recorded by the receivers may be partially processed as it is received, but normally either raw or partially processed data is saved onto tapes which are then transferred to a central data processing unit.

SUMMARY OF THE INVENTION

According to a first aspect, the present invention provides method of processing seismic data, said seismic data having been obtained by:

performing a plurality of sweeps, wherein each sweep comprises generating seismic signals in the earth using a plurality of vibrators by applying a pilot sweep waveform to each vibrator, each pilot sweep being a waveform of changing frequency;

measuring the force applied to the earth by each vibrator to determine a measured force waveform; and measuring the seismic signals at one or more locations remote from the vibrators;

said method comprising:

filtering the measured force waveform to remove harmonics of the pilot sweep and thus determining a filtered force waveform;

generating an inversion operator from the filtered force waveform for each vibrator; and applying said inversion operator to the measured seismic signals to determine the contribution of each vibrator to the seismic signals.

The force waveform applied to the earth may be measured by special sensors, although preferably it is measured by derivation from the signal used by the vibrator controller to control the vibrator output. This may be a weighted sum measurement, consisting of a linear combination of signals from accelerometers on the vibrator.

DETAILED DESCRIPTION OF THE INVENTION

The filtered force waveform may be determined by the application of a time varying notch filter to the measured force waveform, but more preferably the measured force waveform applied to the ground is filtered by cross-correlation with the pilot sweep followed by application of a time window to remove the harmonics of the pilot sweep. Each measured waveform may preferably be cross-correlated with the same pilot sweep. The time window is preferably applied around zero time.

The measured seismic signal is preferably also filtered by cross-correlation with the pilot sweep followed by application of a time window before the application of the inversion operator.

The pilot sweep preferably comprises a waveform having a substantially constant amplitude envelope with tapered ends, within which the frequency increases with time.

The number of sweeps may be the same as the number of vibrators. In another embodiment, the number of sweeps is greater than the number of vibrators, and the noise on each measured seismic signal is estimated and used in the determination of the inversion operator.

In a preferred embodiment, the invention provides a method of performing a seismic survey, comprising:
  performing a plurality of sweeps, wherein each sweep comprises generating seismic signals in the earth using a plurality of vibrators by applying a pilot sweep waveform to each vibrator, each pilot sweep being a waveform of changing frequency;
  measuring the force applied to the earth by each vibrator to determine a measured force waveform;
  measuring the seismic signals at one or more locations remote from the vibrators; and
  processing seismic data comprising the measured seismic signals and the measured force waveform using any of the methods described above.

At least in preferred embodiments, the data can be correlated before inversion, and the cross-coupling and timing error problems are removed. The method is not sensitive to non-linear effects. Further, a greatly reduced quantity of data need be recorded for each vibrator.

If there are the same number of vibrators as sweeps the inversion procedure is straightforward. However, the method may comprise taking more sweeps than there are vibrators.

According to a second aspect, the present invention provides a method of processing seismic data, said seismic data having been obtained by:
  performing n sweeps, each sweep comprising generating seismic signals in the earth using nm vibrators in contact with the earth, where 12 is greater than m;
  measuring the seismic signals at one or more locations remote from the vibrators to determine the seismic data; and
  estimating the noise N associated with the seismic signals for each sweep;
  the method comprising:
  generating a noise correlation matrix P from the noise N associated with each sweep;
  generating a n×m matrix M from the signal provided by each of the is sweeps at each of the m vibrators, each element of the matrix M corresponding to a source signature from one vibrator for one sweep: and
  generating an inversion operator $M^\perp$ for application to said seismic data, said inversion operator being determined by $$M^\perp = (M^* P^{(-1)} M)^{(-1)} M^* P^{(-1)}.$$

The method preferably also comprises selecting rows from M in order to generate all possible square m×m sub-matrices of M;
  wherein the inversion operator $M^\perp$ is generated by performing a relative weighted sum of the inverses of the square m×m sub-matrices, where the relative weight applied to each inverse is the product of the elements of P corresponding to the rows omitted from M to generate the sub-matrix, multiplied by the absolute value of the determinant squared of the sub-matrix.

P may be determined by generating the component $P_{ij}$ of P in the ith column and jth row using $P_{ij} = <N_i N_j^*>$.
Preferably, the inversion operator $M^\perp$ is determined by $$M^\perp = (M^* P^{(-1)} M)^{(-1)} M^* P^{(-1)} = \frac{\sum_{ij\ldots} \left(\prod_{ij\ldots} P_k\right)(|det(M_{ij\ldots})|^2) M_{ij\ldots}^{(-1)}}{\sum_{ij\ldots} \left(\prod_{ij\ldots} P_i\right)(|det(M_{ij\ldots})|^2)}$$

Where $M_{ij\ldots}$ is the m×m sub-matrix.

There may be one more sweep than vibrator, in which case the inversion operator $M^\perp$ may be determined by $$M^\perp = \frac{\sum_{i=1}^{n} P_i |det(M_i)|^2 M_i^{(-1)}}{\sum_{i=1}^{n} P_i |det(M_i)|^2}$$

where $M_i$ is the m×m sub-matrix omitting the ith row of M.

The noise power estimates may preferably be made using quadrature mirror filtering, although alternative methods such as discrete cosine transforms or discrete Fourier transforms may also be used.

In a preferred embodiment, the invention provides a method of performing a seismic survey, comprising:
  performing n sweeps, wherein each sweep comprises generating seismic signals in the earth using m vibrators in contact with the earth, where n is greater than m;
  measuring the seismic signals at one or more locations remote from the vibrators to determine seismic data;
  estimating the noise N associated with the seismic signals for each sweep; and
  processing the seismic data using any method described above.

According to a third aspect, the present invention provides a method of generating seismic data, comprising:
  performing a plurality of sweeps, each sweep comprising generating seismic energy using a plurality of vibrators, each vibrator operating at a different phase, the power applied to each vibrator for each sweep being substantially the same;
  wherein the phases are cycled through the vibrators, in such a way that for n vibrators labelled 1 to n, for each sweep after the first, vibrators number 2 to n use the phases of the vibrators 1 to n−1 respectively from the previous sweep:

and wherein if a matrix is determined from the phases of the vibrators, with each column corresponding to one sweep and each row corresponding to one vibrator, the magnitude of the determinant of the matrix is the same as the dimension of the matrix if the phases of the vibrators are written as complex numbers.

The number of sweeps and number of vibrators may be the same. Alternatively, there may be more sweeps than vibrators, in which case a matrix for the phases of the vibrators may be determined as if there were as many vibrators as there are sweeps, and columns deleted from said matrix so that there are as many columns as there are vibrators.

Preferably, there is one more sweep than there is vibrator.

This method of determining the phases of the vibrators minimises the ambient noise at each receiver by keeping the size of the inversion operator as small as possible.

In preferred embodiments, a seismic survey may be conducted using seismic signals generated using the methods just described and processing data using any of the methods described above.

According to a fourth aspect, the present invention provides a computer readable medium carrying a computer program arranged to perform any of the methods described above.

BRIEF DESCRIPTION OF THE DRAWINGS

Some preferred embodiments of the invention will now be described, by way of example only, and with reference to the accompanying drawings, in which.

DETAILED DESCRIPTION OF THE INVENTION

Figure 1:
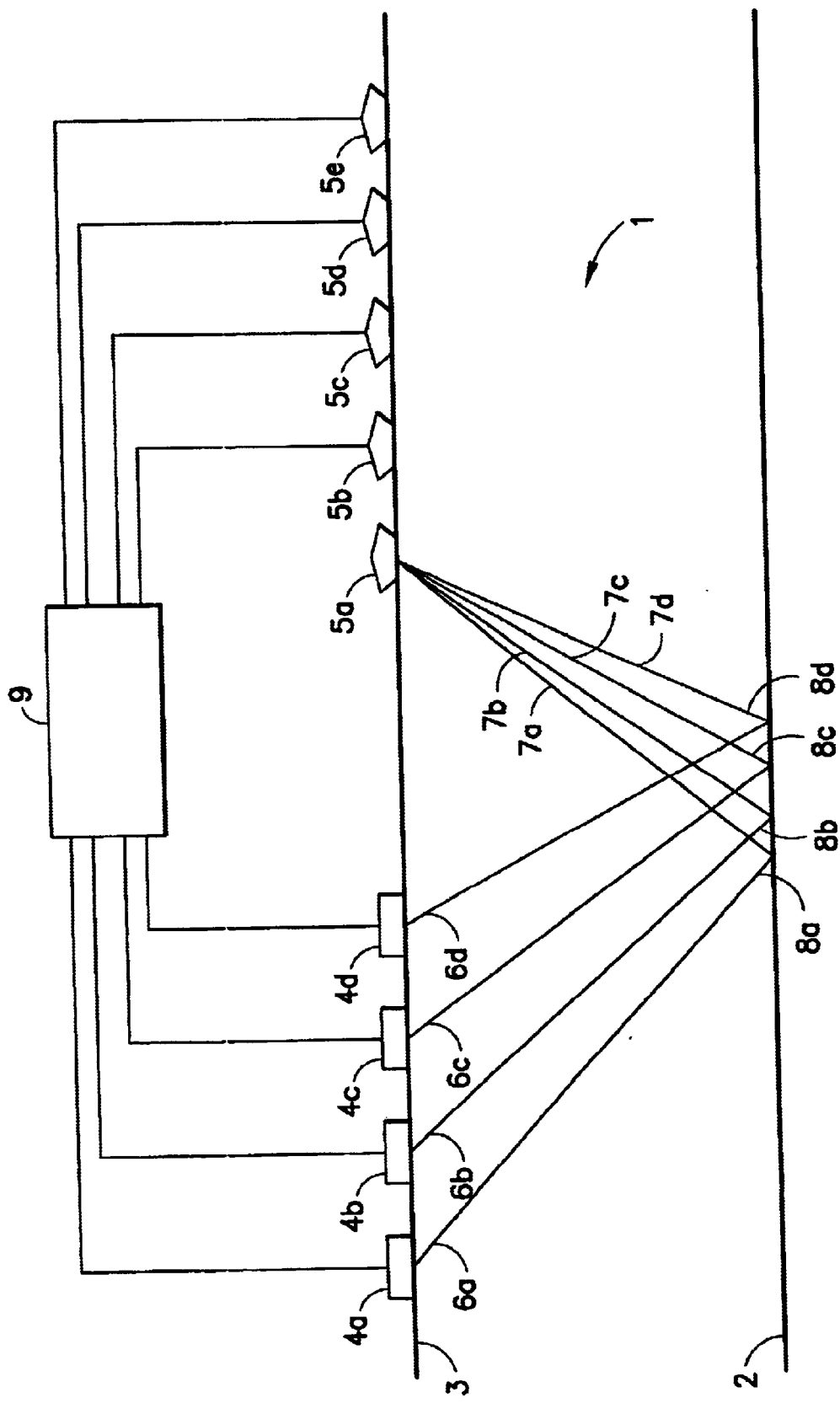
FIG. 1 shows schematically an arrangement of vibrators and geophones for performing a simultaneous vibratory seismic survey.

FIG. 1 shows schematically an arrangement of vibrators and geophones for performing a simultaneous vibratory seismic survey of a portion of the earth 1, having an interface 2 between strata at some distance below the earth's surface 3. A series of vibrators 4a, 4b, 4c, 4d are placed on the earth's surface 2 in order to emit signals into the earth 1. At a distance from the vibrators, a series of geophones 5a, 5b, 5c, 5d, 5e are also placed on the earth's surface to record vibrations transmitted through the earth.

The vibrators 4a to 4d emit seismic signals simultaneously. The signals 6 travel down into the earth and are reflected 7 by the interface 2 back towards the surface 3. Here the reflected signals 7 are detected by the geophones 5a to 5e. The path 8 followed by vibrations to geophone 5a only is shown, and the following discussion concentrates on the signal received by a single geophone. Clearly the same procedure will be followed to process the data received by each geophone 5b to 5e as for geophone 5a.

There is a controller 9 linked to the vibrators 4 and geophones 5. This controller generates the signals applied to the vibrators in order to cause them to emit signals into the ground. Each signal consists of a "sweep" or "shot", where for a typical sweep the frequency of the signal applied to the vibrator increases linearly with time through the sweep, and the amplitude is constant except at the beginning and end, when it must be ramped. This sweep applied to the vibrator is called the "pilot sweep". It will be appreciated that other forms of pilot sweep are possible, for example having a varying amplitude or rate of change of frequency.

The signal received at geophone 5a is a composite of the four signals 7a, 7b, 7c, 7d received from the four vibrators. It is therefore necessary to separate out the signal from each vibrator in order to determine the characteristics of each individual path 8a, 8b, 8c, 8d. In order to do this, the vibrators 4a to 4d are simultaneously supplied with sweeps that are identical in all respects except their phase, and this is repeated at least four times with a different phase signature each time, so that each of the geophones 5 receives at least four signals. At the geophone 5a, therefore, there will be four sweeps to be combined to determine the behaviour of vibrations through the earth from four geophones.

This combination can be expressed in matrix form. If G is the signal measured at the geophone and R is the earth response from each vibrator to the geophone, then we have $$G = M * R$$

where M is the source signature. M is a 4×4 matrix where each column represents one vibrator, and each row represents one sweep. R is a 4×1 vector in which each element represents the earth response from one vibrator to the geophone, and G is a 4×1 vector in which each element represents one recorded sweep at the geophone.

In other words, if $g_i$=recorded signal no. i, $s_{ji}$=the signal from vibrator no. j at sweep no. i, and $r_j$=earth response between vibrator j and the geophone:

$$\begin{pmatrix} g_1 \\ g_2 \\ g_3 \\ g_4 \end{pmatrix} = \begin{pmatrix} s_{11} & s_{21} & s_{31} & s_{41} \\ s_{12} & s_{22} & s_{32} & s_{42} \\ s_{13} & s_{23} & s_{33} & s_{43} \\ s_{14} & s_{24} & s_{34} & s_{44} \end{pmatrix} \begin{pmatrix} r_1 \\ r_2 \\ r_3 \\ r_4 \end{pmatrix}$$

The seismic survey measures G in an attempt to determine R, so what is needed is the inverse of M. This would be straightforward if force applied to the ground by the vibrators exactly followed the sweep applied to the vibrators. However, as described in the introduction, the force applied to the ground by each vibrator may deviate from the ideal pilot sweep in one of two ways:

1. As well as applying a force at the desired frequency (known as the fundamental), the vibrator also applies a force at integer multiples of that frequency (known as harmonics).
2. The force applied at the fundamental frequency deviates in amplitude and/or phase from the pilot sweep.

Figure 2:
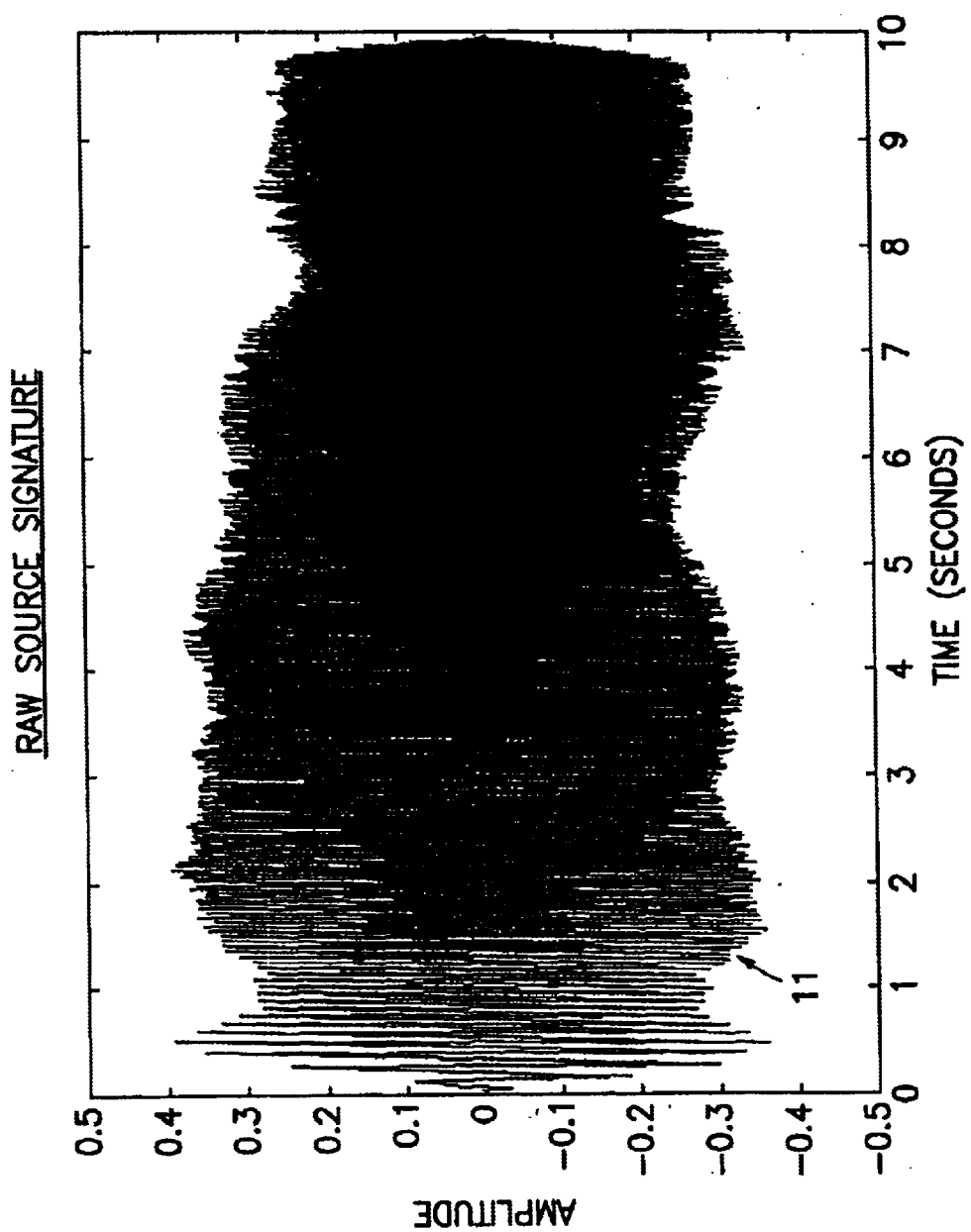
FIG. 2 shows the waveform of the force applied to the earth during a single sweep by a typical vibrator.

FIG. 2 shows a trace 11 of the force applied to the ground against time for a typical vibrator. It will be noted that the amplitude envelope of the signal is variable through the sweep.

Therefore in order to perform the inversion described above it is necessary to take account of the response of the earth to each vibrator.

As described in the introduction, known methods used to perform the inversion include an assumption that the vibrators follow the pilot sweep exactly, and the use of a measurement of the force applied to the earth by the vibrator, including all harmonics and amplitude and phase discrepancies. In other words the second prior art method would use the trace 11 shown in FIG. 2 to determine the inversion operator.

A better way to perform this inversion is to use a measurement of the force applied to the earth by the vibrator at the fundamental frequency only. In other words, the inversion is performed using a measurement of the force applied to the earth from which the harmonics have been removed, but which retains all information about the amplitude and phase variations.

Firstly, therefore, a raw measurement of the force must be made. This may come from special sensors, but more usually it derives from the signal that the vibrator controller uses to control the vibrator output (this is generally a so-called weighted sum measurement, consisting of a linear combination of signals from accelerometers on the vibrator baseplate and the oscillating mass).

The raw measurement must be filtered so as to leave only the fundamental. There are a number of means of doing this, such as applying a time varying notch filter. An alternative method uses cross-correlation of the measurement with a pilot sweep. This is a sweep with the same amplitude and frequency against time as the desired sweep for the vibrator—but not necessarily with the same phase. Cross-correlation normally involves the multiplication of the Fourier transform of the measured force by the complex conjugate of the Fourier transform of the pilot sweep, followed by an inverse Fourier transform to return the signal to the time domain. However, it can be performed entirely in the time domain without the need for Fourier transforms.

Figure 3:
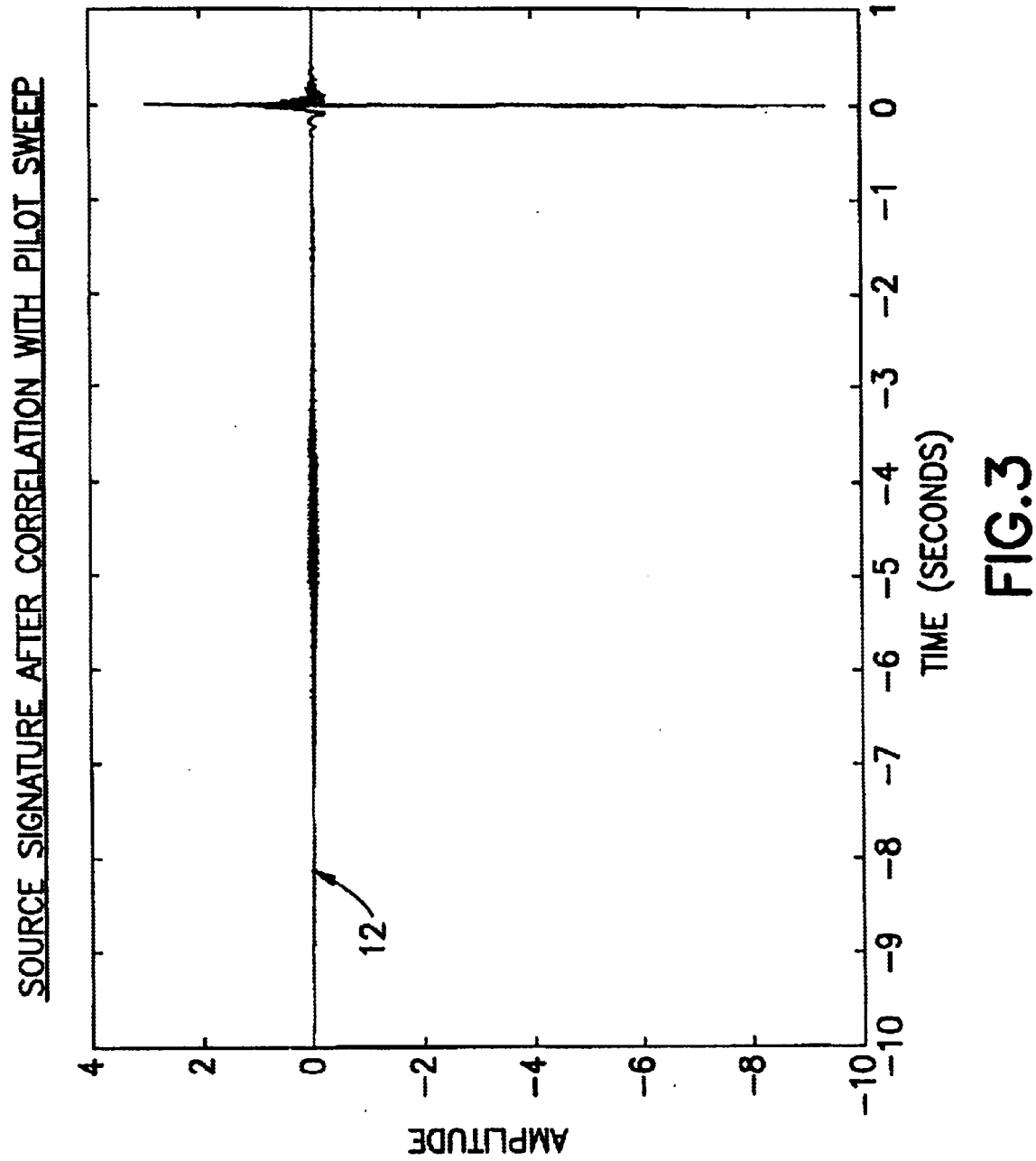
FIG. 3 shows the measured source signature after cross-correlation with a pilot sweep.

FIG. 3 shows the source signature 12 after cross-correlation with the pilot sweep. It will be noted that there is a spike around zero time, corresponding to the fundamental, but that there is also energy at negative times. This part of the signal corresponds to the harmonics, and is therefore the part that is not wanted.

Figure 4:
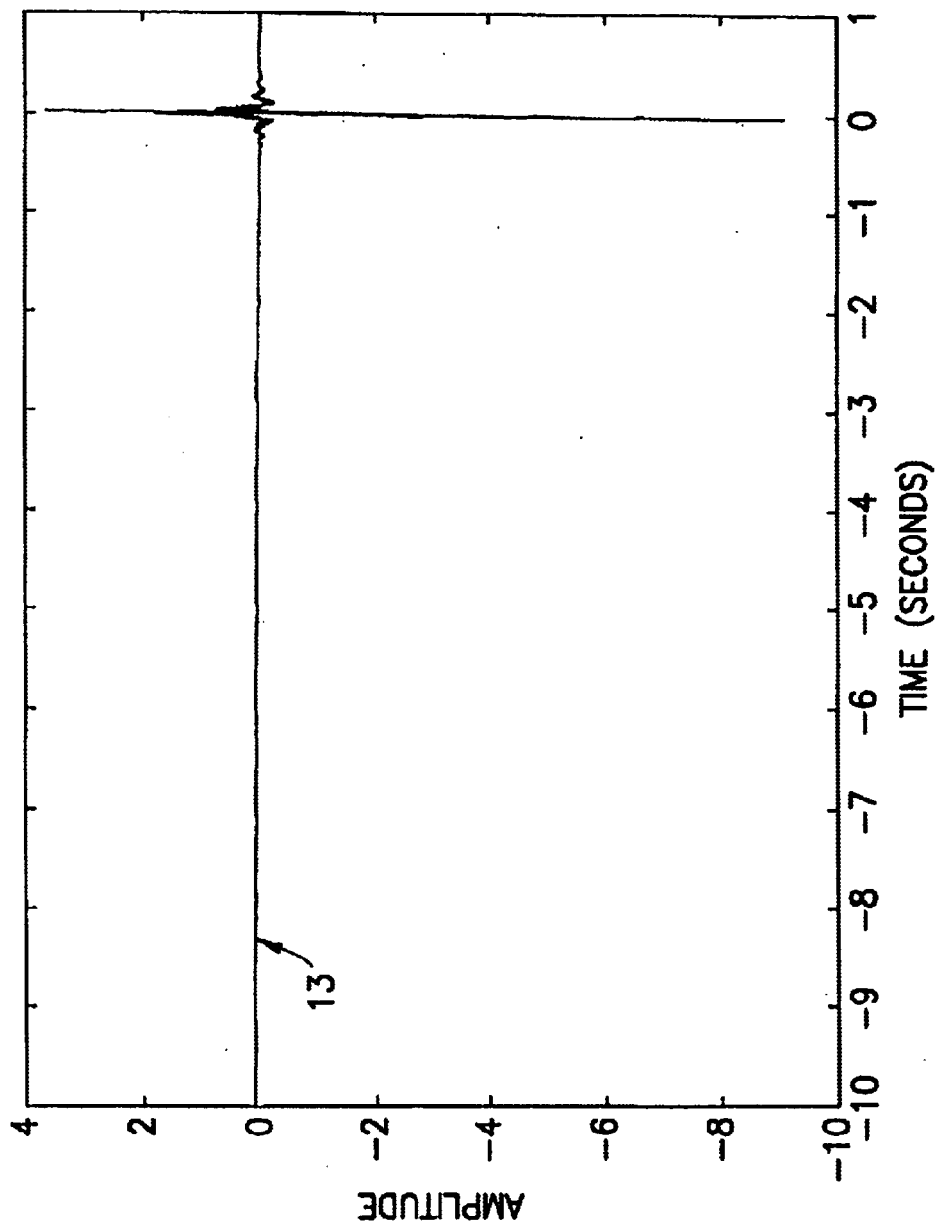
FIG. 4 shows the measured source signature after cross-correlation with a pilot sweep and time windowing.

Therefore, after cross-correlation, the data are windowed around zero time. For normal sweep parameters the time window around zero can be quite short—half a second total width at the outside, a quarter of a second is normally sufficient. FIG. 4 shows the source signature 13 after this time windowing. All of the energy corresponding to the harmonics has been removed, leaving only the energy corresponding to the fundamental.

Figure 5:
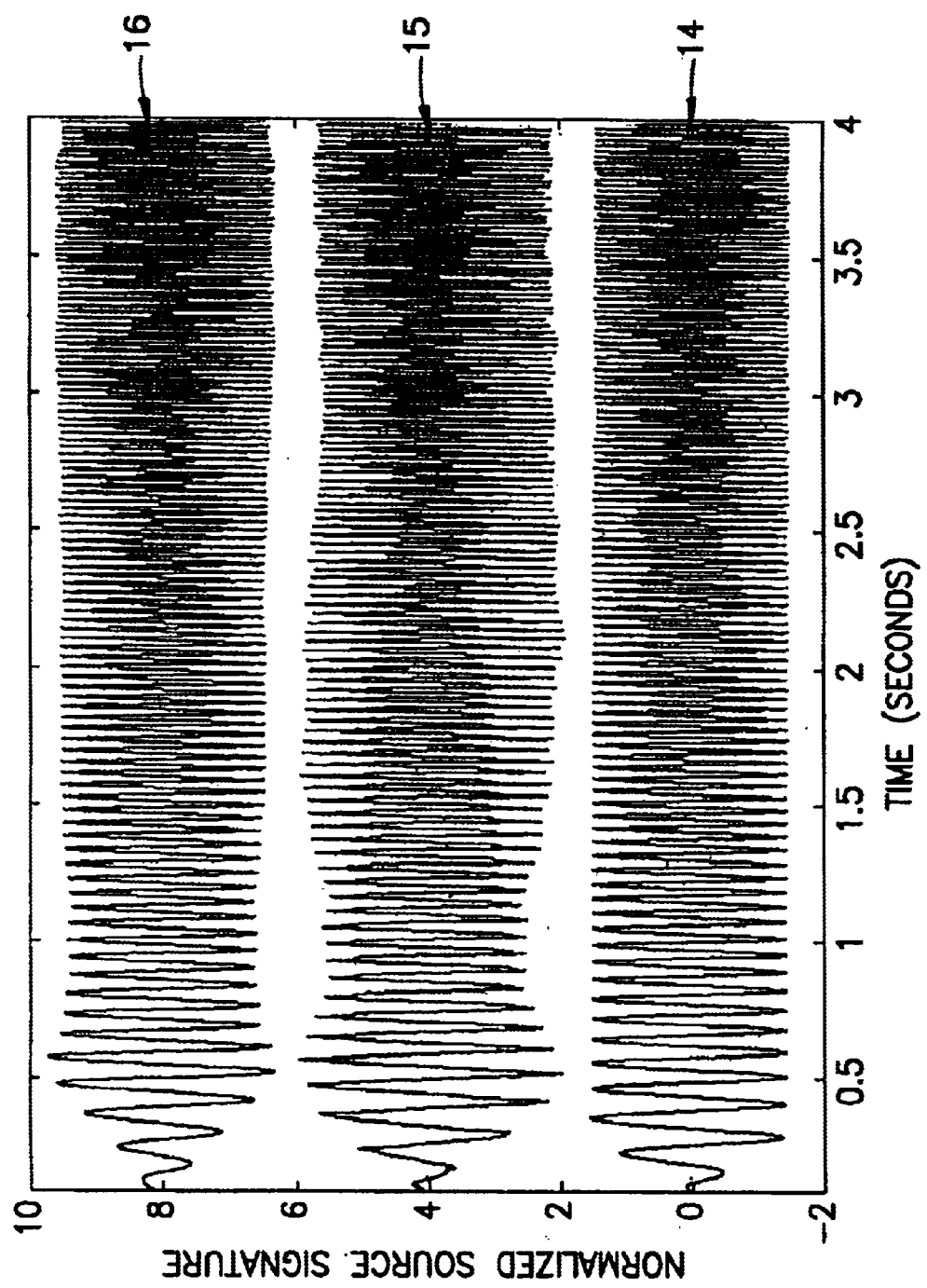
FIG. 5 shows a source signal with and without filtering to remove harmonics.

FIG. 5 shows a signal with and without filtering to remove harmonics. Line 14 shows the pilot sweep, with a ramp up to start, followed by a signal with constant amplitude and linearly increasing frequency with time. Line 15 shows the measured source signature (as in FIG. 2), normalised to the same mean amplitude as the pilot sweep. The amplitude varies, and at low frequencies it is clear that the waveform shape is different.

Line 16 shows the measured fundamental. Now the amplitude varies in the same manner as the measured source signature 15, but the wave form is similar to that of the pilot sweep 14.

Figure 6:
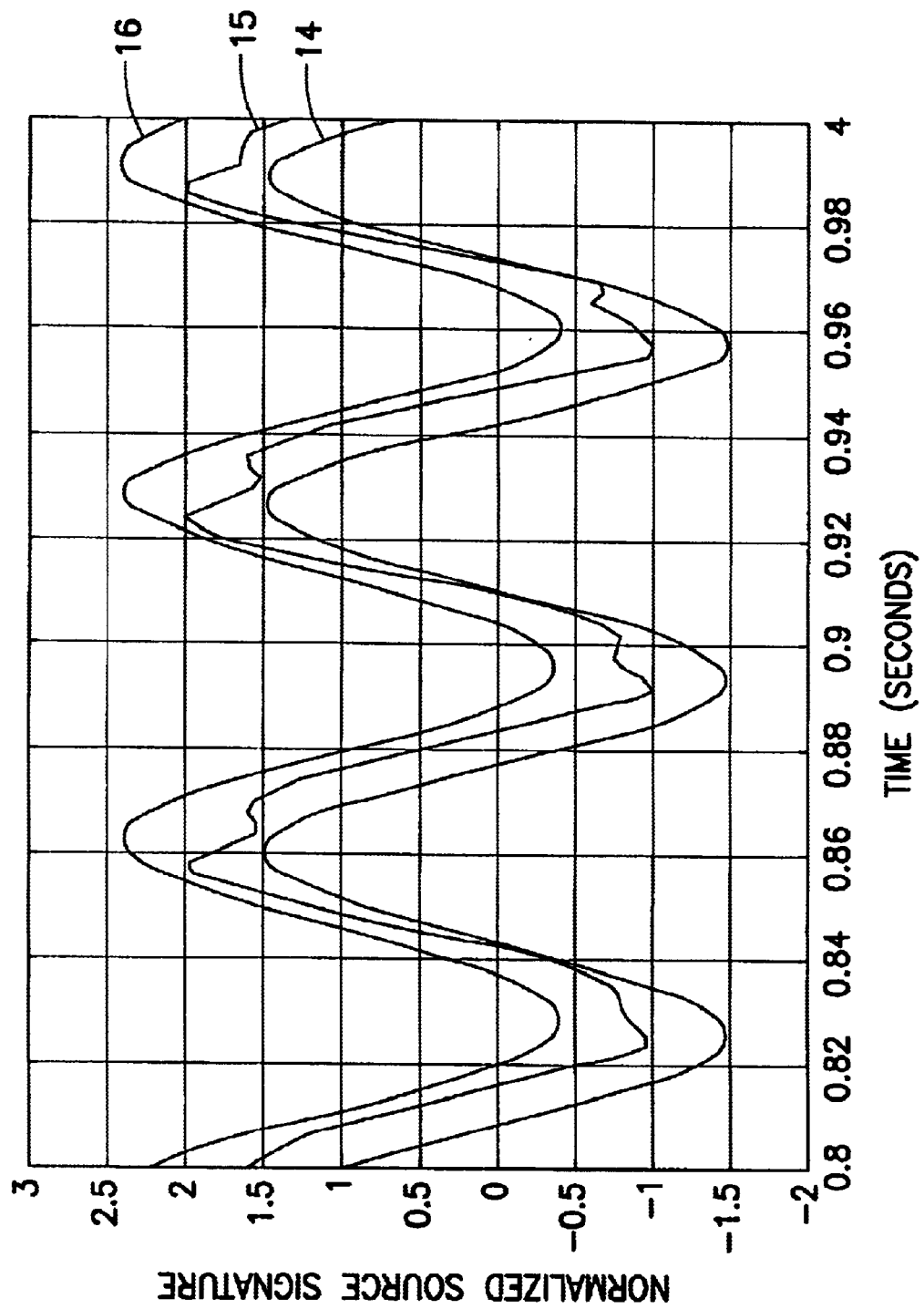
FIG. 6 shows detail of the signals of FIG. 5.

FIG. 6 shows the same signals in more detail between 0.8 and 1 seconds. The measured fundamental 16 is in phase with the measured source signature 15, and slightly out of phase with the pilot sweep 14, but has the same frequency content as the pilot sweep 14.

The next stage is to multiply the data by a windowing function (a function that goes smoothly to zero at the edges of the window). This is done simply to ensure that there are no irregularities at the edge of the data. Following this, the source signature is Fourier transformed back to the frequency domain, and this now gives an estimate of the Fourier transform of the fundamental applied to the ground, multiplied by the complex conjugate of the Fourier transform of the pilot sweep.

The same transformation is applied to the receiver data (cross-correlation with a pilot sweep and windowing), except that for the receiver data the time window goes from 0 to the listening time (the maximum time needed for the seismogram).

Figure 7:
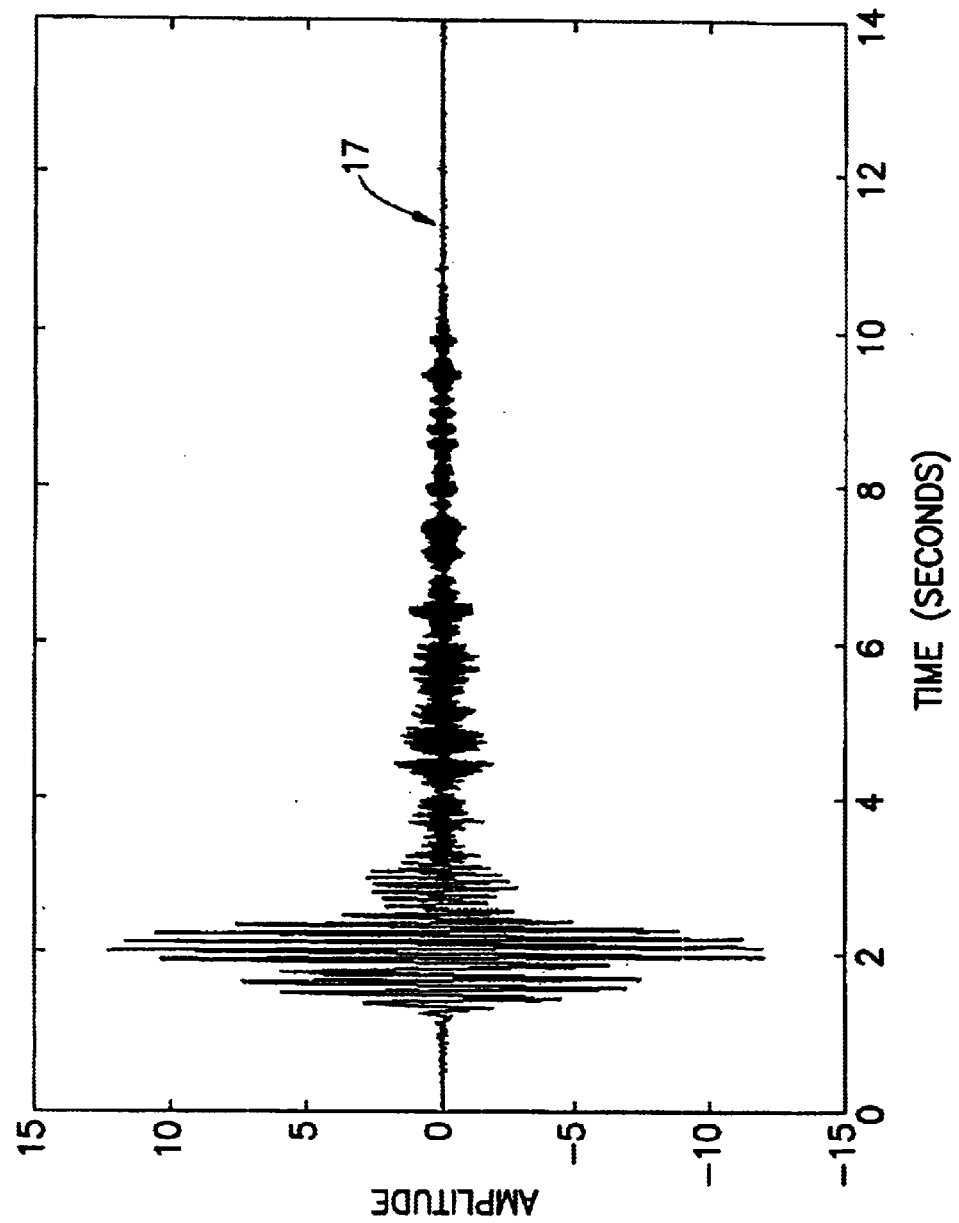
FIG. 7 shows an uncorrelated geophone trace.
Figure 8:
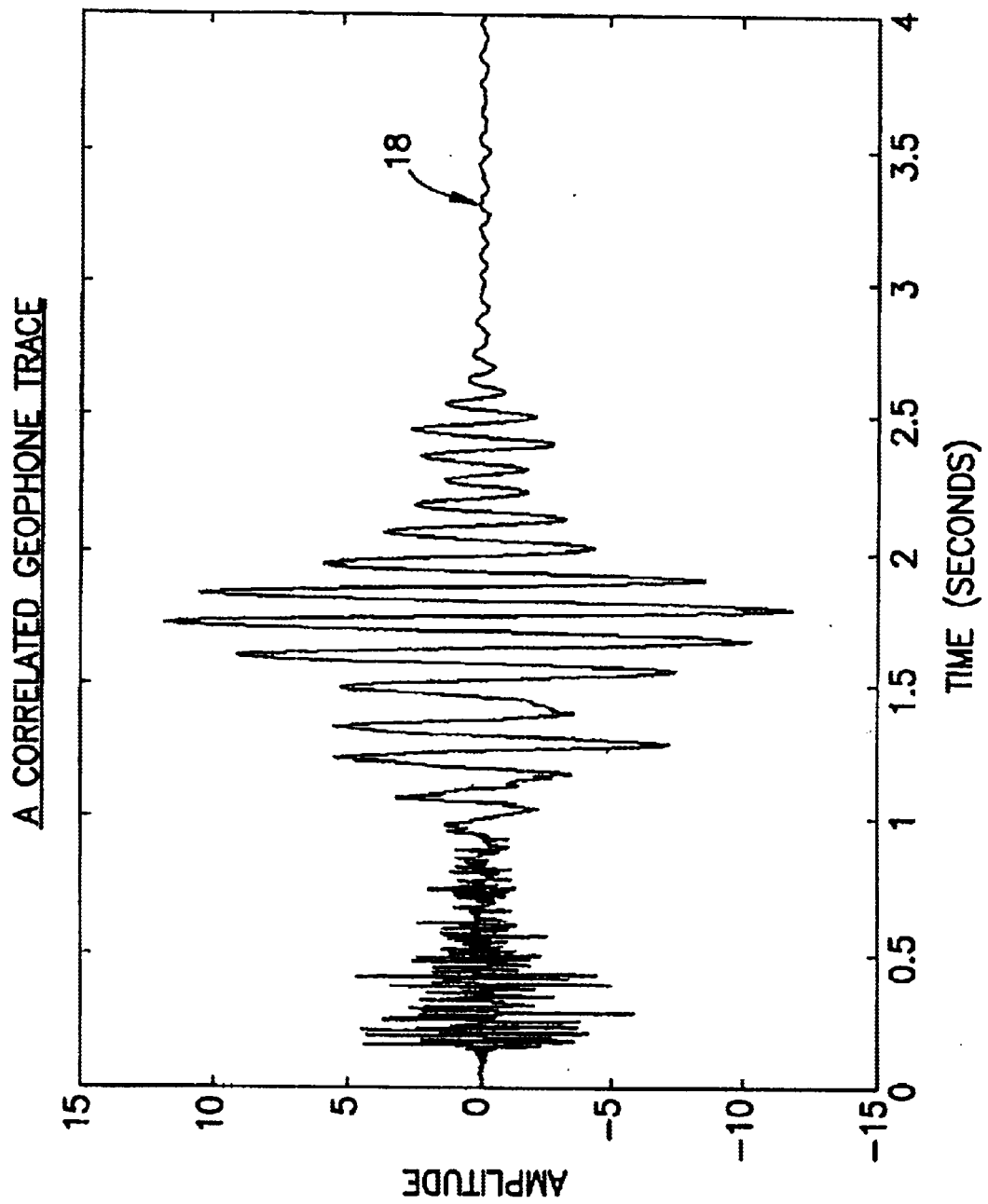
FIG. 8 shows a geophone trace after cross-correlation with a pilot sweep and windowing.

FIG. 7 shows an uncorrelated geophone trace 17, and FIG. 8 shows a geophone trace after cross-correlation with the pilot sweep and windowing.

Figure 9:
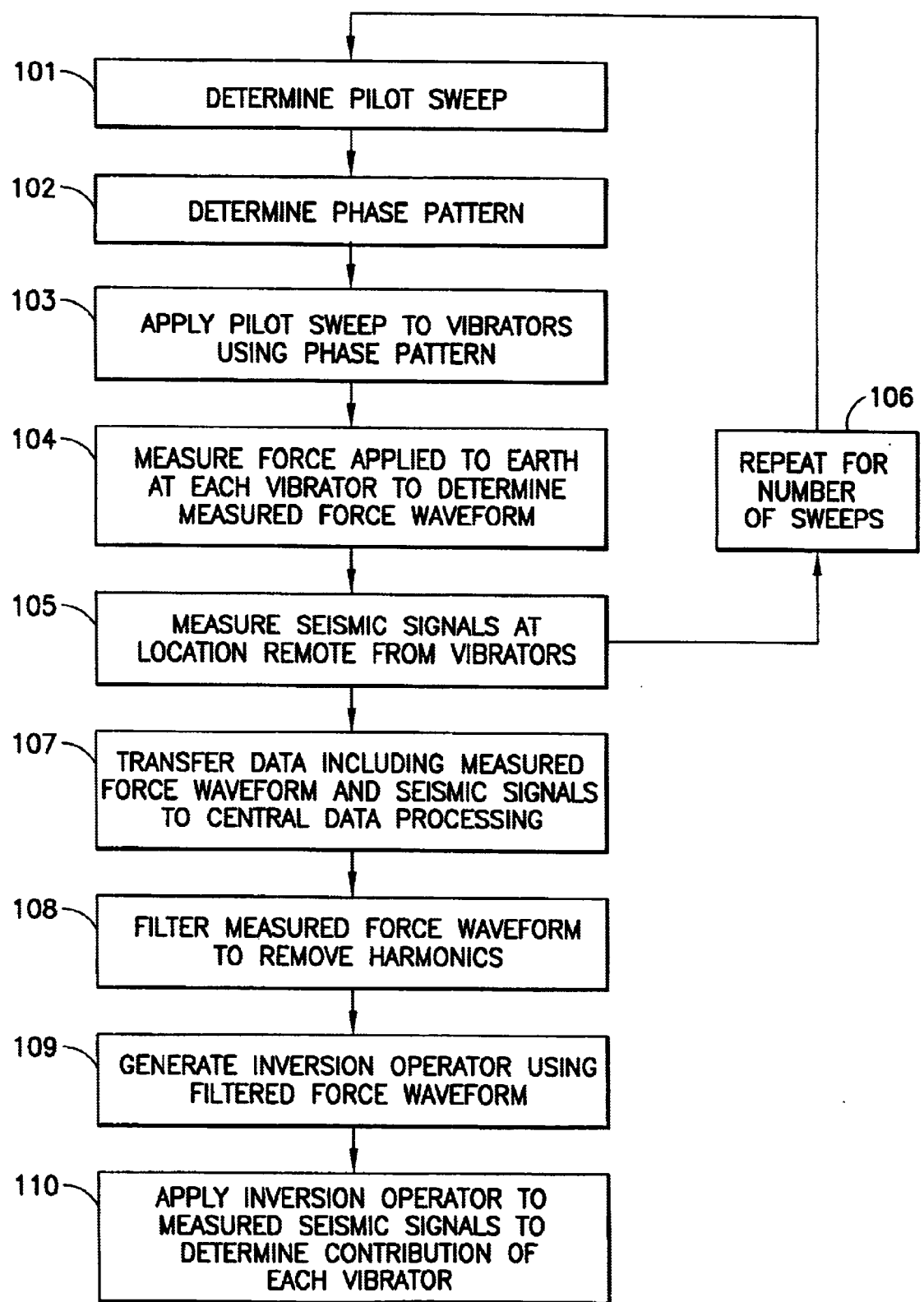
FIG. 9 illustrates a method for performing a seismic survey in flow chart form.

FIG. 9 illustrates the main operations detailed above in the form of a flow chart.

If there are the same number of vibrators as shots, then the inversion procedure is straightforward. The only subtleties come from ensuring that the inversion is well-behaved at the edges of the vibrator's frequency band.

One example of carrying out the inversion procedure is as follows:

Let M(f) be the matrix of the Fourier transform of the fundamental, multiplied by the complex conjugate of the Fourier transform of the pilot sweep, as a function of frequency. M(f) is determined as described above for each sweep at each vibrator.

Let W(f) be a frequency domain windowing function, which is close to 1 over the main bandwidth of the vibrator sweep, and tends to zero outside the sweep band. If $f_0$ is the lowest frequency of the sweep, $f_1$ the upper frequency, $f_0^F$ the lowest frequency at full amplitude and $f_1^F$ the highest frequency at full amplitude, then an example of W(f) is given by $$W(f) = \frac{1}{4}\left(1 + \tanh\left(f - \frac{4f_0^F}{(f_0^F - f_0)}\right)\right)\left(1 + \tanh\left(\frac{4f_1^F}{(f_1 - f_1^F)} - f\right)\right).$$

Let S(f) be the ideal version of M(f), i.e. if the vibrator had followed its design sweep exactly, M and S would be same.

Let $S^\perp(f)$ be a matrix such that $S^\perp S$ is proportional to the identity matrix, real and of the same magnitude as the absolute value of the pilot sweep squared.

Let $\hat{M}$ (a scalar) be the median of the values of the absolute value of M between $$f_0^F \text{ and } f_1^F.$$

Finally let $\Lambda$ be a small positive number (for example 0.01) to regularise the matrix inversion of M.

A suitable inverse operator is given for each frequency by $$M^\perp = \frac{1}{\hat{M}} * (1 - W) * S^\perp + W * (\Lambda \hat{M} + M)^{(-1)}$$

As well as inverting the signal at the geophone, the inverse operator must not magnify any noise. The term involving Λ makes the inverse better conditioned. The conditioning of the matrix inversion depends on the ration of the maximum to the minimum eigenvalues of M. The larger this ratio, the less stable the inversion (the more it will magnify any noise present). At the end of the frequency band of the sweep, M can be ill-conditioned. Adding the Λ term ensures that the eigenvalues cannot get too small, at the expense of the calculated matrix not being exactly an inverse of M.

The first term on the right takes the inverse smoothly from inverting the data correctly in-band (where there is a signal) to being zero out of band (where there is nothing to invert).

When more shots are taken than there are vibrators, the system is called over-determined. There is a much greater choice in how to invert the data. If there are m vibrators each making n shots then clearly any set of nm of these shots may be used for inversion—thus it is clear that the space of inverses is n-in dimensional.

If the noise on each recorded trace is equal, then it is well known that the best inverse (in the sense of minimising the noise on the final traces) is given by $$M^\perp = (M^*M)^{(-1)}M^*$$

If some regularisation is required then, as above, a small regularisation constant may be added to the matrix $M^*M$. Therefore once regularisation and windowing are included, we have $$M^\perp = \frac{1}{\hat{M}} * (1-W) * S^\perp + W * (\Lambda \hat{M}^2 + M^*M)^{(-1)} M^*$$

Alternatively, a better method of inversion is to include an estimate of the noise on each recorded trace and to use this in the inversion process.

If there are n shots, then at each receiver there are n traces; each of which has noise N, in other words N is what would have been measured at the geophone had the vibrator not been sweeping. We can define the matrix P as the correlation matrix of the noise N. The component of P in the ith column and jth row ($P_{ij}$) is given by $$P_{ij} = \langle N_i N_j^* \rangle$$

where the brackets denote an averaged value. The diagonal of P is real and corresponds to the noise power. The off-diagonal terms give an indication of how similar the noise during one shot is to the noise during another shot. For normal (environmental) noise it is reasonable to assume that these off-diagonal terms are zero, so for traces recorded at different times, this will normally be a diagonal matrix—since noise on different traces will be uncorrelated—and the diagonal elements $P_{jj}$ will be denoted $P_j$. However, more generally, if linear combinations of traces are taken, the noise may be correlated—and the more general inverse that allows for this and minimises the total noise is given by $$M^\perp = (M^* P^{(-1)} M)^{(-1)} M^* P^{(-1)}$$

As above, if necessary a regularisation constant may be added to the main inversion $(M^* P^{(-1)} M)^{(-1)}$, and frequency domain windowing will be necessary. In this formulation, a different inverse is normally required to be calculated for each seismic receiver since the noise at each receiver will be different, in which case an estimate of the noise on each trace is needed It is also possible to estimate the noise averaged over groups of receivers, and thus generating an inverse operator that is applied to all the receivers in that group. In this case only as many different inverses are required as there are groups of receivers, reducing the amount of calculation required and hence increasing computational efficiency.

In the case where the traces are recorded at different times, and hence the noise is uncorrelated, a matrix identity may be used. If there are ii shots with m vibrators, then there are $$\frac{n!}{m!(n-m)!}$$

ways to choose a square m×m matrix from the rows of M. We shall denote by $M_{jk\ldots}$ the m×m matrix that omits rows j, k etc.

There are n−m suffices in general.

$$M_{jk\ldots}^{-1}$$

is the inverse of this matrix, expanded into an m×n matrix, with zeros in the columns which were omitted from $M_{jk\ldots}$. It may be shown that the following is an identity, where det denotes the determinant.

$$M^\perp = (M^* P^{(-1)} M)^{(-1)} M^* P^{(-1)} \quad (A)$$

$$= \frac{\sum_{ij\ldots}\left(\prod_{ij\ldots} P_k\right)(|det(M_{ij\ldots})|^2) M_{ij\ldots}^{(-1)}}{\sum_{ij\ldots}\left(\prod_{ij\ldots} P_i\right)(|det(M_{ij\ldots})|^2)}$$

(The symbol $$\left(\prod_{ij\ldots} P_k\right)$$

denotes a product of the n−m powers $P_i$, $P_j$ etc.) Thus the general, noise minimising, inverse is a weighted sum of the inverses of the square matrices $M_{jk\ldots}$, where the relative weight applied to each is the product of the elements of P of the rows omitted from $M_{jk\ldots}$, multiplied by the absolute value of the determinant of $M_{jk\ldots}$ squared. In the event any of these square matrices is singular (it has no inverse), the factor multiplying by the determinant ensures that the term vanishes.

This equation is simplest in the case where there is one more shot than vibrator. In this case there are n square submatrices, each of which omits one row.

$$M^\perp = \frac{\sum_{i=1}^{n} P_i |det(M_i)|^2 M_i^{(-1)}}{\sum_{i=1}^{n} P_i |det(M_i)|^2} \quad (B)$$

In equation B, each term $M_i^{(-1)}$ has omitted one shot in calculating the inverse. As well as being multi plied by the determinant factor, it is multiplied by the noise power measured during that omitted shot. Therefore, if all of the shots were very clean of noise except one (for example, if a lorry drove past), the sum would be dominated by the inverse that omits the data when the lorry drove past. In the more general case (equation A), where for each inverse more than one shot is omitted, the inverse is mulitplied by the products of all the noise powers of the omitted shots.

The advantage of using formulae A and B is that the operators need be calculated only once for each set of shots, and can be applied to all the recorded traces.

The best use of the formulae comes when the power estimates are made in a time-frequency domain such as using quadrature mirror filtering, or discrete cosine transforms, or discrete Fourier transforms. There are a number of ways of estimating the noise power on each recorded trace at a particular time and frequency. The easiest is to take an averaged total power (including signal) over a range of time and frequencies surrounding that time and frequency. For bad signal to noise this will be approximately the noise power—for good signal to noise the matrix inversion will still be well conditioned and the final decomposed traces will have good signal to noise. This requires the signal matrix to be chosen properly in advance, with little variation in eigenvalue amplitude. The method for predetermining the signal matrix is described later in this specification.

Therefore, in order to determine the earth response using m vibrators and n=m+1 shots, the following procedure is adopted:

1. The matrices $M_i^{(-1)}$ are calculated in the frequency domain, in the manner described above, and applied to the Fourier transform of the receiver traces, transformed back to the time domain and time-windowed between 0 and the listening time.
2. For each frequency the numbers det($M_i$) are calculated and normalised (divided by the sums of the squares of the absolute value of the determinants at that frequency). The determinants are then averaged over frequency bands, corresponding to the bands to be used in the time-frequency domain transformation.
3. For each receiver there are now II raw traces, one per shot, and for each receiver/vibrator position pair there are n traces, from step 1.
4. A time-frequency transformation is applied to all the traces. A noise power estimate $P_i$ is generated at each time and frequency by taking a power average, around that time and frequency, and then the n receiver/vibrator pairs are averaged according to equation B, generating a time-frequency transformed trace of the signal at one receiver from one vibrator position.
5. All the traces are transformed back to the time domain.

The only difference when the number of shots exceeds the number of vibrator positions by more than one is that the average is now over $$\frac{n!}{m!(n-m)!}$$

receiver/vibrator position pairs, and in the average (n−m) power estimates must be multiplied together. These are the powers in the traces that have been omitted from receiver/vibrator pair estimates. Alternatively, dividing top and bottom in equation B by the product of all the power estimates, in the average the product of the powers of the omitted traces is replaced by the product of the inverses of the powers of the included traces.

Figure 10:
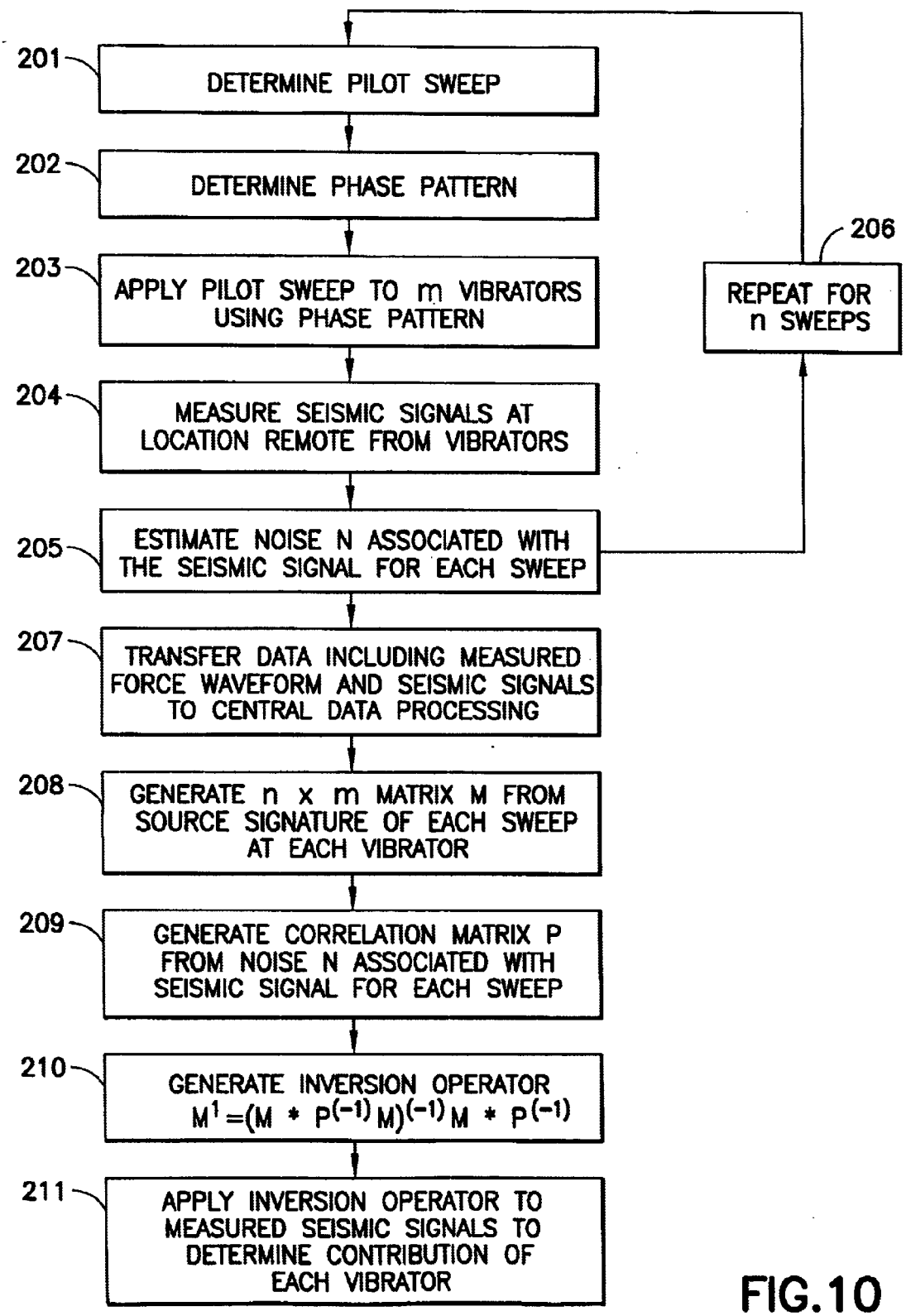
FIG. 10 illustrates a method for performing a seismic survey in flow chart form.
Figure 11:
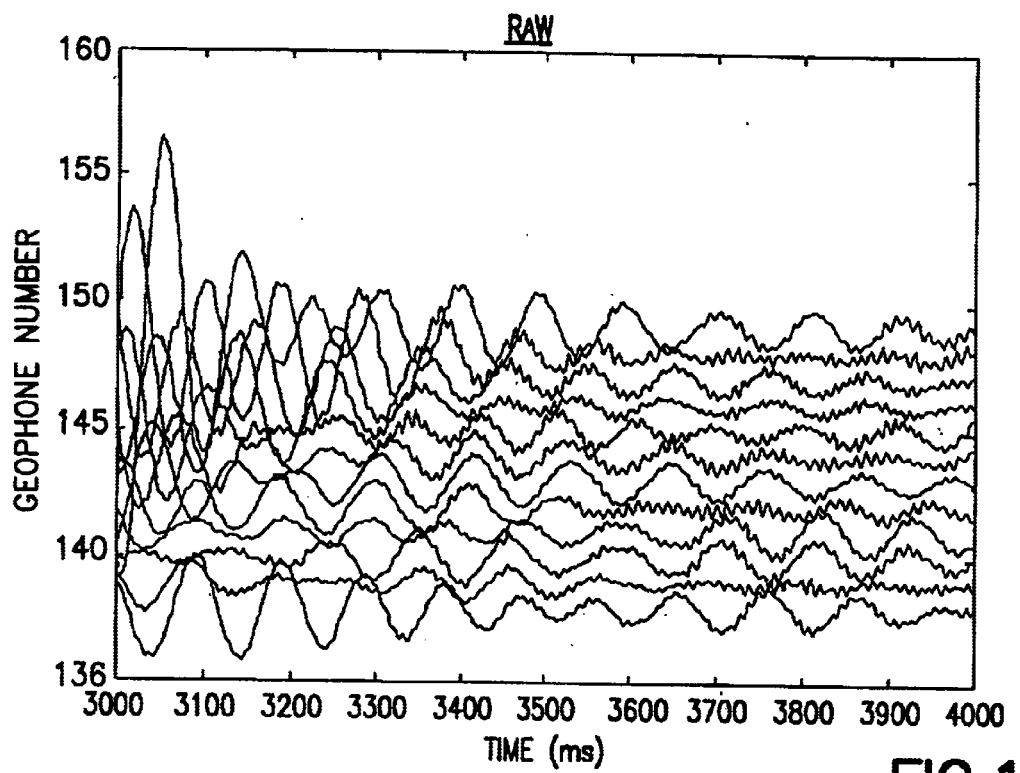
FIG. 11 shows the seismogram at 12 geophones from a single vibrator obtained using a standard inversion.
Figure 12:
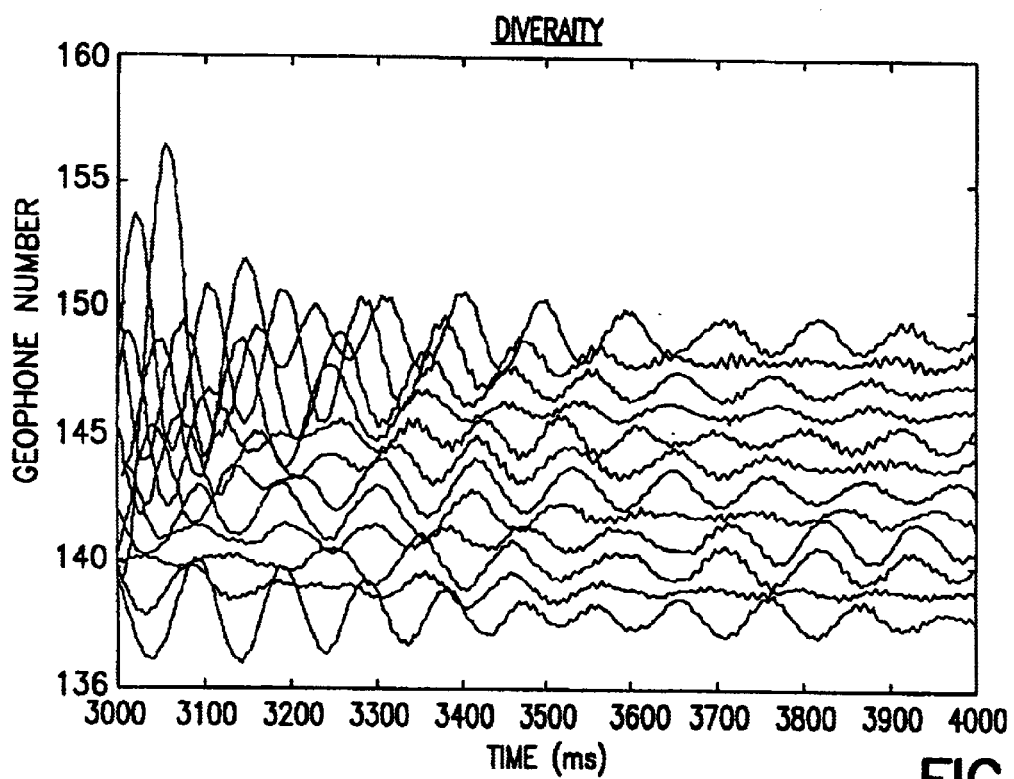
FIG. 12 shows the seismogram of FIG. 11 derived using a diversity simultaneous inversion method.

FIG. 10 illustrates the important steps described above in flow chart form.

As mentioned above, it is also important to consider the sweep patterns applied to the vibrators, so as to minimise the inversion operator and avoid magnifying noise unnecessarily during the inversion procedure. There are certain sweep patterns that are particularly advantageous to use, being both well conditioned for inversion and operationally easy to implement.

The patterns are best described when the number of vibrators equals the number of shots, and are generated subject to the following conditions:

1. The signal applied to each vibrator has the same amplitude, only the phases vary.
2. The phases are cycled through the vibrators. The m vibrators can be labelled from 1 to m in such a way that for each shot after the first, vibrators number 2 to m use the phases of vibrators 1 to m−1 respectively from the previous shot. Vibrator 1 uses the phase of vibrator m from the previous shot.
3. The magnitude of the determinant is the same as the dimension of the matrix (when the elements in the matrix are expressed as the phase of the vibrator as a complex number).

The imposition of condition 3 has the effect that the inverse of the matrix is the complex conjugate of the transpose divided by the dimension.

For two vibrators an example of such a pattern is $$\begin{pmatrix} 90 & 0 \\ 0 & 90 \end{pmatrix}$$

where the rows indicate the shot number, and the columns vibrator number. The elements in the matrix are the phase of the vibrator in degrees. This matrix can also be written as $$\begin{pmatrix} i & 1 \\ 1 & i \end{pmatrix}$$

where the elements in the matrix show the phase of the vibrator as a complex number. Here the determinant is −2, so the magnitude of the determinant and dimension are both 2, thus fulfilling, condition (3) above.

Note that, for this matrix, $$\frac{(M^T)^*}{2} = \frac{1}{2}\begin{pmatrix} -i & 1 \\ 1 & -i \end{pmatrix} = M^{(-1)},$$

as required by the adjunct to Condition 3.

For three vibrators an example of such a pattern is $$\begin{pmatrix} 120 & 0 & 0 \\ 0 & 120 & 0 \\ 0 & 0 & 120 \end{pmatrix}$$

Note that there are variations on this pattern which will also satisfy the conditions above. For example, for three vibrators a phase reversal or phase shift could be used:

$$\begin{pmatrix} -120 & 0 & 0 \\ 0 & -120 & 0 \\ 0 & 0 & -120 \end{pmatrix} \text{ or } \begin{pmatrix} 0 & -120 & -120 \\ -120 & 0 & -120 \\ -120 & -120 & 0 \end{pmatrix}$$

For four vibrators an example is $$\begin{pmatrix} 180 & 0 & 0 & 0 \\ 0 & 180 & 0 & 0 \\ 0 & 0 & 180 & 0 \\ 0 & 0 & 0 & 180 \end{pmatrix}$$

together with its phase reversal and phase shifts, for example $$\begin{pmatrix} -180 & 0 & 0 & 0 \\ 0 & -180 & 0 & 0 \\ 0 & 0 & -180 & 0 \\ 0 & 0 & 0 & -180 \end{pmatrix} \text{ and } \begin{pmatrix} 270 & 90 & 90 & 90 \\ 90 & 270 & 90 & 90 \\ 90 & 90 & 270 & 90 \\ 90 & 90 & 90 & 270 \end{pmatrix}.$$

For five vibrators an example is $$\begin{pmatrix} 0 & 144 & -144 & -144 & 144 \\ 144 & 0 & 144 & -144 & -144 \\ -144 & 144 & 0 & 144 & -144 \\ -144 & -144 & 144 & 0 & 144 \\ 144 & -144 & -144 & 144 & 0 \end{pmatrix}$$

For six vibrators an example is $$\begin{pmatrix} 0 & 30 & 0 & -90 & 120 & -90 \\ -90 & 0 & 30 & 0 & -90 & 120 \\ 120 & -90 & 0 & 30 & 0 & -90 \\ -90 & 120 & -90 & 0 & 30 & 0 \\ 0 & -90 & 120 & -90 & 0 & 30 \\ 30 & 0 & -90 & 120 & -90 & 0 \end{pmatrix}$$

For seven vibrators an example is $$\begin{pmatrix} -2x & 2x & 0 & -x & -x & 0 & 2x \\ 2x & -2x & 2x & 0 & -x & -x & 0 \\ 0 & 2x & -2x & 2x & 0 & -x & -x \\ -x & 0 & 2x & -2x & 2x & 0 & -x \\ -x & -x & 0 & 2x & -2x & 2x & 0 \\ 0 & -x & -x & 0 & 2x & -2x & 2x \\ 2x & 0 & -x & -x & 0 & 2x & -2x \end{pmatrix}$$

Where x is 360/7°.

This method of generating patterns also works well if there is one more shot than vibrator. If there are n=m+1 shots and m vibrators, the matrix for n vibrators and n shots is generated, and one of the columns removed, leaving m columns.

These patterns will also give good signal to noise because, when applying generalised diversity inversion, if the vibrator follows the pilot sweep exactly, the matrices $M_i$ all have determinants with the same magnitude.

FIG. 9 shows one second of a seismogram from data acquired during simultaneous acquisition with three seismic vibrators, shooting four times at each shot point. The figure shows the final seismogram at twelve geophones, from one vibrator position. The data has high frequency noise over much of the last second.

FIG. 10 shows the result of applying the diversity simultaneous inversion method described above. The noise amplitude has been considerably reduced.

It will be appreciated that departures from the description above will still fall within the scope of the invention. For example, the system has been described for signals generated by land vibrators comprising a weight and a base plate, and detected by geophones. However, in the invention can equally well be applied to signals generated by marine vibrators, either submerged, floating on the water and detected by either land or marine receivers. Floating vibrators are similar to land vibrators, and have a vibrating mass on a base plate in contact with the water. Submerged vibrators generally comprise a clam shell arrangement consisting of two rigid half-domes flexibly connected and oscillating with respect to one another.

It will be noted that the force applied to the ground by a land vibrator (and measured accelerometers) is equivalent to the force applied to the water by a marine vibrator (also measured by accelerometers). As described herein, this has been defined as the "force applied to the earth", but this phrase is intended to include both force applied to land and force applied to water.

What is claimed is:

1. A method of processing seismic data, said seismic data having been obtained by steps comprising:
   performing a plurality of sweeps, wherein each sweep comprises generating seismic signals in the earth using a plurality of vibrators by applying a pilot sweep waveform to each vibrator, each pilot sweep being a waveform of changing frequency;
   measuring the force applied to the earth by each vibrator to determine a measured force waveform; and
   measuring the seismic signals at one or more locations remote from the vibrators;
   filtering the measured force waveform to remove harmonics of the pilot sweep from the measured force waveform and thus determining a filtered force waveform;
   generating an inversion operator from the filtered force waveform for each vibrator; and
   applying said inversion operator to the measured seismic signals to determine the contribution of each vibrator to the seismic signals.

2. A method as claimed in claim 1, wherein the step of measuring the force applied to the earth is performed using signals from accelerometers on the vibrator in combination with the pilot sweep.

3. A method as claimed in claim 1, wherein the measured force waveform is filtered using a time varying notch filter.

4. A method as claimed in claim 1, wherein the measured force waveform is filtered by cross-correlation with the pilot sweep followed by application of a time window to remove the harmonics of the pilot sweep.

5. A method as claimed in claim 1, wherein each measured force waveform is filtered by cross-correlation with the same pilot sweep followed by application of a time window to remove the harmonics of the pilot sweep.

6. A method as claimed in claim 4, wherein the time window is applied to include zero time after cross-correlation.

7. A method as claimed in claim 1, wherein each measured seismic signal is filtered by cross-correlation with the pilot sweep followed by application of a time window before the application of the inversion operator.

8. A method as claimed in claim 1, wherein the pilot sweep comprises a waveform having a substantially constant amplitude envelope with tapered ends, within which the frequency increases with time.

9. A method as claimed in claim 1, wherein the number of sweeps is the same as the number of vibrators.

10. A method as claimed in claim 1, wherein the number of sweeps is greater than the number of vibrators, and wherein the noise on each measured seismic signal is estimated and used in the determination of the inversion operator.

11. A method of performing a seismic survey, comprising:

performing a plurality of sweeps, wherein each sweep comprises generating seismic signals in the earth using a plurality of vibrators by applying a pilot sweep waveform to each vibrator, each pilot sweep being a waveform of changing frequency;

measuring the force applied to the earth by each vibrator to determine a measured force waveform;

measuring the seismic signals at one or more locations remote from the vibrators; and processing seismic data comprising the measured seismic signals and the measured force waveform using the the steps of filtering the measured force waveform to remove harmonics of the pilot sweep from the measured force waveform and thus determining a filtered force waveform;

generating an inversion operator from the filtered force waveform for each vibrator; and applying said inversion operator to the measured seismic signals to determine the contribution of each vibrator to the seismic signals.

* * * * *